United States Patent Office 2,989,521
Patented June 20, 1961

---

2,989,521
METHOD OF CROSS-LINKING AND OXIDIZING STARCH
Frederic R. Senti, Russell L. Mellies, and Charles L. Mehltretter, Peoria, Ill., assignors to the United States of America as represented by the Secretary of Agriculture
Filed June 30, 1959, Ser. No. 824,162
3 Claims. (Cl. 260—233.3)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the government of the United States of America.

The instant invention rates to a simplified and commercially very advantageous method of treating cornstarch so that a cooked paste made with starch which has been treated in accordance with the herein set forth invention will have been tailered to provide any desired moderate to high viscosity, which is stabilized to prolonged heating and also exhibits clarity, and exceptional resistance to "set-back." Such starches have obvious advantages in certain coating and sizing operations over the employment of untreated starch or of dicarboxyl starch since the latter have disadvantageously high viscosities for certain operations and untreated starch has very little, if any, resistance to "set-back." Also, the starches of the instant invention gelantinize very quickly and thus require shorter heating for industrial use.

In copending application Serial No. 629,425 of Hofreiter et al., now U.S. Patent No. 2,894,945, dicarboxyl starch, formed by successively oxidizing cornstarch first to dialdehyde starch with periodate and then quantitatively further oxidizing to dicarboxyl starch with chlorous acid, is shown to exhibit an extraordinarily high hot-paste viscosity which has merit in certain operations.

In copending application Serial No. 777,549 of Hofreiter et al., now U.S. Patent No. 2,929,811, it is taught that whereas the high viscosity of a hot paste made with the dicarboxyl starch of the aforementioned U.S. Patent No. 2,894,945 is not stable to prolonged heating, this very advantageous additional property may be built into the dicarboxyl starch of U.S. Patent No. 2,894,945 by prior cross-linking with epichlorohydrin to the small but critical extent of between 1000–200 anhydroglucose units per cross-link.

According to the instant invention we so modify starch that hot pastes prepared therewith exhibit essentially moderate viscosities having good stability to prolonged heating as well as excellent resistance to "set-back" and great clarity. We inexpensively and conveniently obtain starch having these properties by successively treating cornstarch in only two steps with only one oxidation reagent rather than with two, as in U.S. Patent No. 2,929,-811. The specific reagents employed in the instantly claimed method or process consist only of epichlorohydrin and sodium hypochlorite, in the presence of excess alkali such as sodium hydroxide to provide the necessary alkalinity. Thus, it is apparent that the method of the instant invention enjoys the marked commercial advantages of providing a choice of viscosities while eliminating the use of periodate, an exceedingly expensive reagent, and of substituting the more available sodium hypochlorite for the relatively expensive and hazardous sodium chlorite.

It is known that the oxidation of starch with sodium hypochlorite forms a mixture comprising carbonyl starch units and dicarboxyl starch units as well as a number of poorly characterized partially oxidized end products. However, in view of the critical relationship of the degree of cross-linking required with the fully dicarboxylated starch formed in the two-stage oxidation of U.S. Patent No. 2,929,811, it would be expected that the presence of substantial amounts of carbonyl end-products would prevent the desired stabilization of the viscosity to prolonged heating, since this requires a critical balance of solubilization tendency, gelation tendency, and resistance to degradation. Contrary to the above expectation, we have discovered that by the process of the instant invention certain interrelationships, detailed below, involving much higher degrees of cross-linking and certain molarities of carboxyl content through oxidation by sodium hypochlorite, we obtain a modified starch having the described paste properties. It is emphasized that the end-product comprises a heterogenous mixture of cross-linked dicarboxyl starch and some cross-linked aldehyde starch, which mixture can be selectively formed to provide viscosity characteristics substantially overlapping those of the modified starches of the said copending applications.

The practical accomplishment of our invention is the outgrowth of two rather distinct components of discovery, namely, that with a closed rather than an open system for cross-linking of starch by epichlorohydrin, about 80 percent of the epichlorohydrin reacts and it thus becomes possible, predictably, to obtain substantially any desired degree of cross-linking; secondly, we have determined that the desired stabilization of the hot-paste viscosity requires a critical relationship between the degree of oxidation (expressed as moles of carboxyl per 100 AGU) and the degree of cross-linking (expressed as AGU's/C.L.). In round numbers, paralleling the detailed values set forth in Table I, it may be noted that with very high degrees of cross-linking such as 25–50 AGU's/C.L., about 9 moles of carboxyl or 4.5 moles of dicarboxyl per 100 AGU's of starch are required whereas with a lesser degree of cross-linking such as 100 AGU's/C.L. only about 6 moles of carboxyl or 3 moles of dicarboxyl per 100 AGU's should be present, and with a still lower extent of cross-linking such as with 200–250 AGU's/C.L. only somewhat above 3 moles of carboxyl or 1.5 moles of dicarboxyl per 100 AGU's provide the best stabilization for the particular hot paste viscosity developed.

TABLE I

*Oxidation of cross-linked starches with sodium hypochlorite*

| | Percent NaOCl Consumed | Moles COOH/100 AGU | Max. Visc. (g.-cm.) | Final Visc. (g.-cm.) | Brookfield (cps.) | |
|---|---|---|---|---|---|---|
| | | | | | Initial | 1 wk. |
| 100 AGU/C.L. (8 hrs. oxidation) | 98.2 | 6.09 | 290 | 125 | 2,835 | 2,460 |
| 50 AGU/C.L. (8 hrs. oxidation) | 98.5 | 9.43 | 847 | 163 | 3,140 | 2,915 |
| 25 AGU/C.L. (8 hrs. oxidation) | 97.7 | 10.23 | 115 | 73 | 1,830 | 1,520 |

TABLE II

*Oxidation of cross-linked starches with sodium hypochlorite*

| Hours Oxidation | Maximum viscosity, g-cm. | Viscosity, g-cm. after 1 hr. of heating | Brookfield initial (cps.) 25° C. | Cps. after 1 week, 25° C. |
|---|---|---|---|---|
| Untreated Starch | (Max. 158) | 141 | 3,650 | 6,720 ("Setback") |
| 250 AGU/C.L.: | | | | |
| 1 | 0 | 0 | 19 | 19 |
| 2 | 16 | 0 | 298 | 260 |
| 3 | 65 | 59 | 1,560 | 1,484 |
| 4 | 137 | 91 | 1,754 | 1,712 |
| 5 | 211 | 88 | 1,724 | 1,658 |
| 6 | 225 | 77 | 1,626 | 1,568 |
| 7 | 231 | 65 | 1,392 | 1,344 |
| 8 | 234 | 65 | 1,358 | 1,326 |
| 175 AGU/C.L.: | | | | |
| 1 | 0 | 0 | 17 | 17 |
| 2 | 0 | 0 | 116 | 115 |
| 3 | 0 | 0 | 582 | 460 |
| 4 | 33 | 33 | 1,248 | 984 |
| 5 | 67 | 12 | 1,780 | 1,575 |
| 6 | 75 | 73 | 1,750 | 1,775 |
| 7 | 95 | 83 | 2,055 | 1,870 |
| 8 | 95 | 83 | 2,165 | 2,055 |
| 150 AGU/C.L.: | | | | |
| 1 | 0 | 0 | 11.5 | 10.5 |
| 2 | 0 | 0 | 31 | 29.5 |
| 3 | 0 | 0 | 252 | 212 |
| 4 | 8 | 8 | 602 | 492 |
| 5 | 22 | 22 | 1,180 | 870 |
| 6 | 41 | 48 | 1,482 | 1,310 |
| 7 | 58 | 54 | 1,600 | 1,470 |
| 8 | 91 | 77 | 1,740 | 1,145 |

The viscosities shown in Tables I and II and in Figures 1–7 were determined upon 5 percent concentrations of the isolated products using the Corn Industries Research Foundation viscometer at a bath temperature of 92° C., giving torque resistance values in gm.-cms., and also in centipoises (cps.) using a Brookfield Synchro-Electric viscometer at a constant spindle speed of 20 r.p.m. at 25° C. immediately after preparation and again, at 25° C. one week later. The centipoise values in the figures were obtained by multiplying the obtained gm.-cm. values by the factor 100/35.

With reference to the several figures of the drawings:

FIGURE 1 compares the pasting curves of untreated starch and 1000 AGU/C.L. starch oxidized for intervals ranging from 1–7 hours.

FIGURE 2 shows similar curves for untreated starch and 250 AGU/C.L. starch oxidized to different extents with sodium hypochlorite.

FIGURE 3 compares the pasting curve of untreated starch with those of oxidized non-cross-linked starch.

Figure 1:
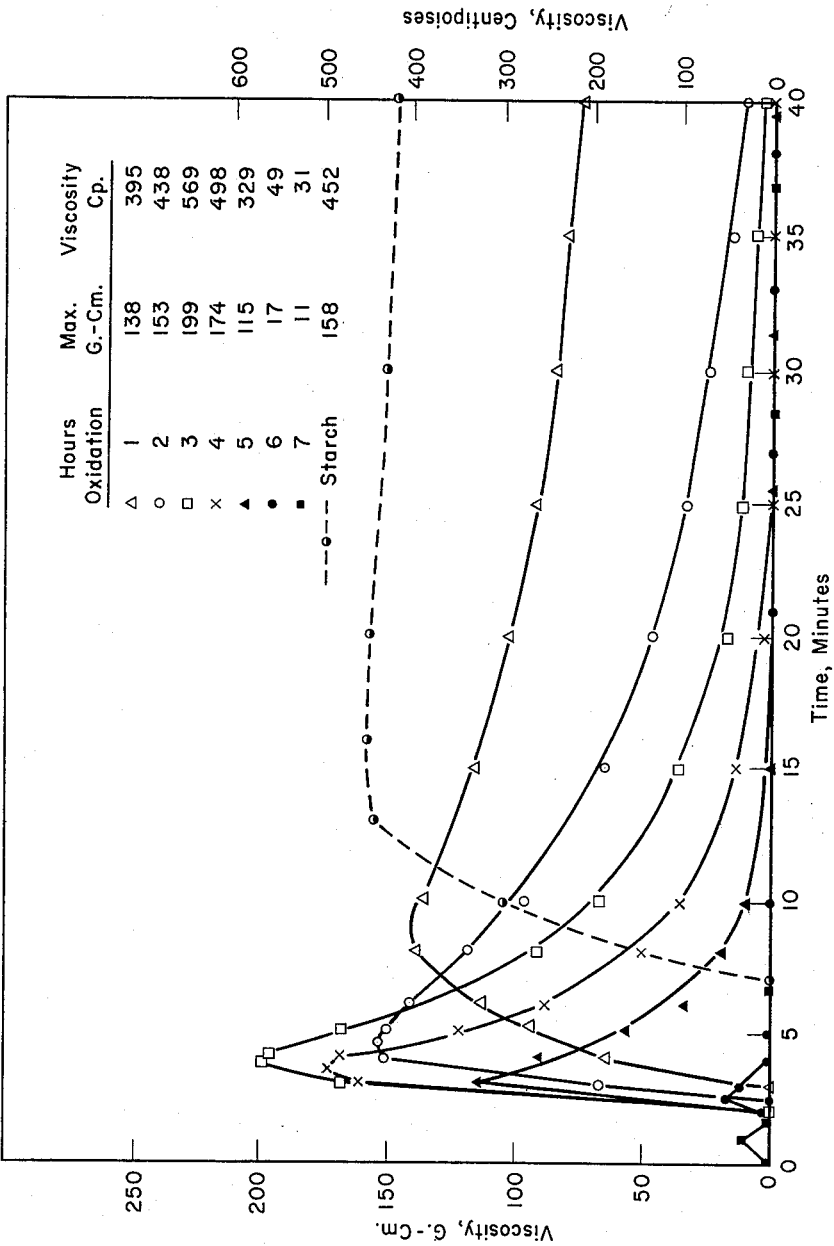
Figure 2:
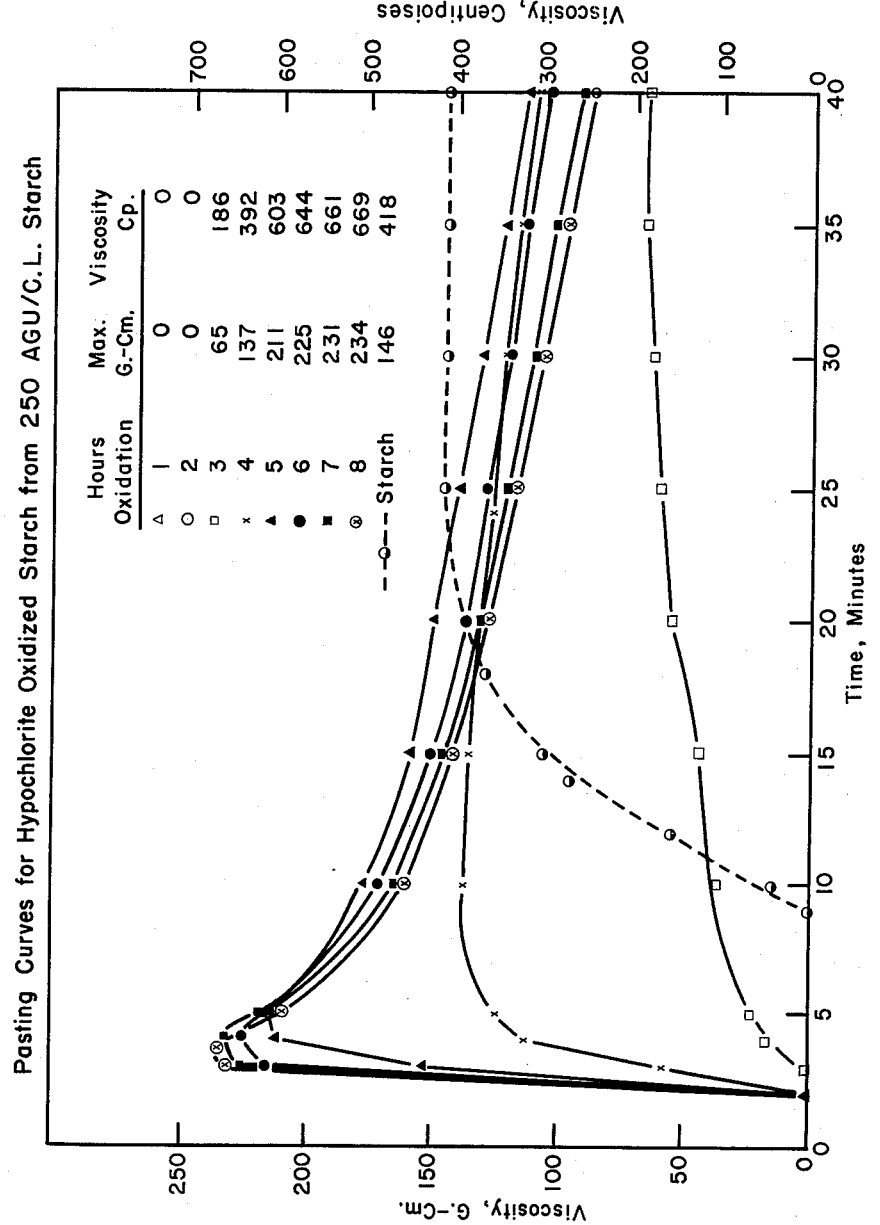
Figure 3:
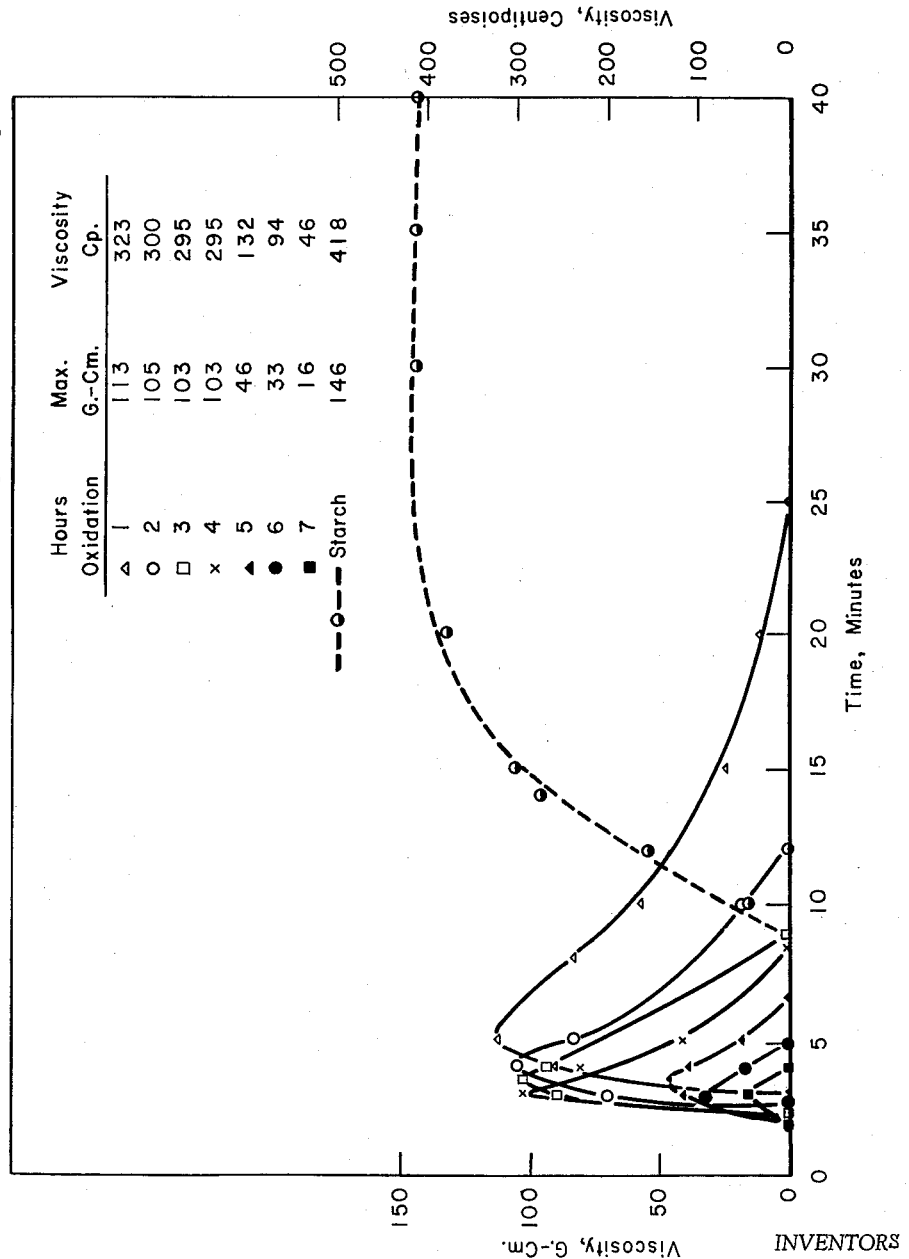
Figure 4:
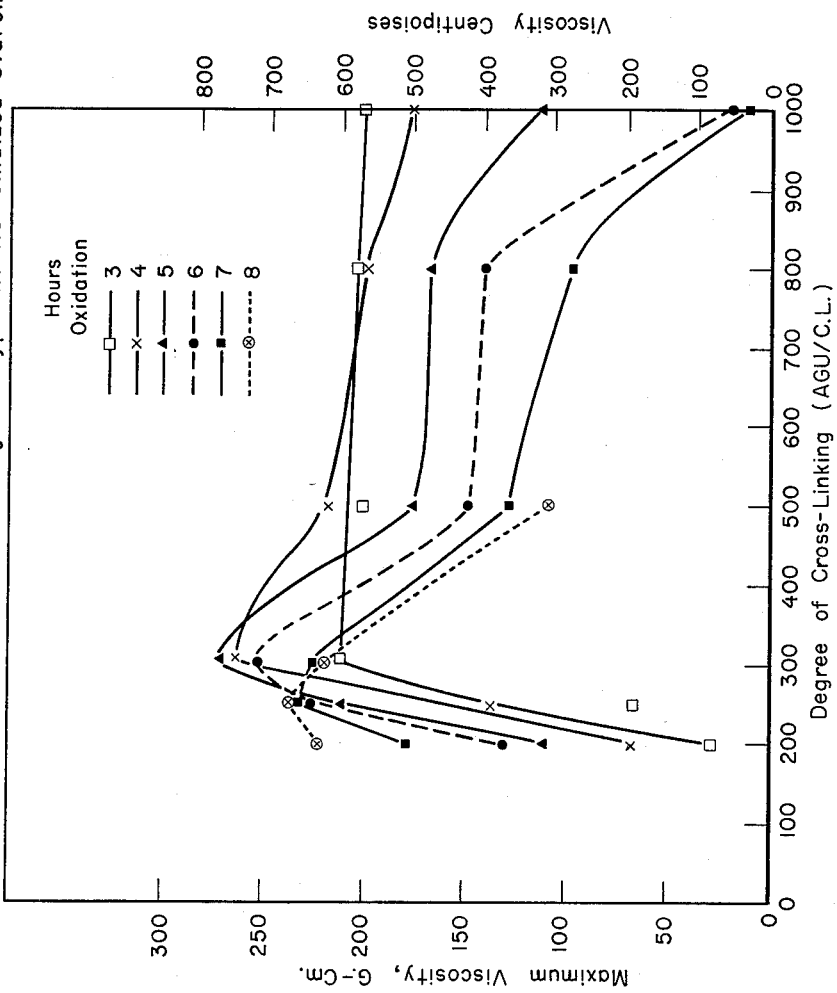
FIGURE 4 shows the maximum viscosity (in grams/cms.) as related to degree of cross-linking and extent of oxidation with sodium hypochlorite. As shown in this figure the maximum viscosity occurs at 300 AGU's/C.L.
Figure 5:
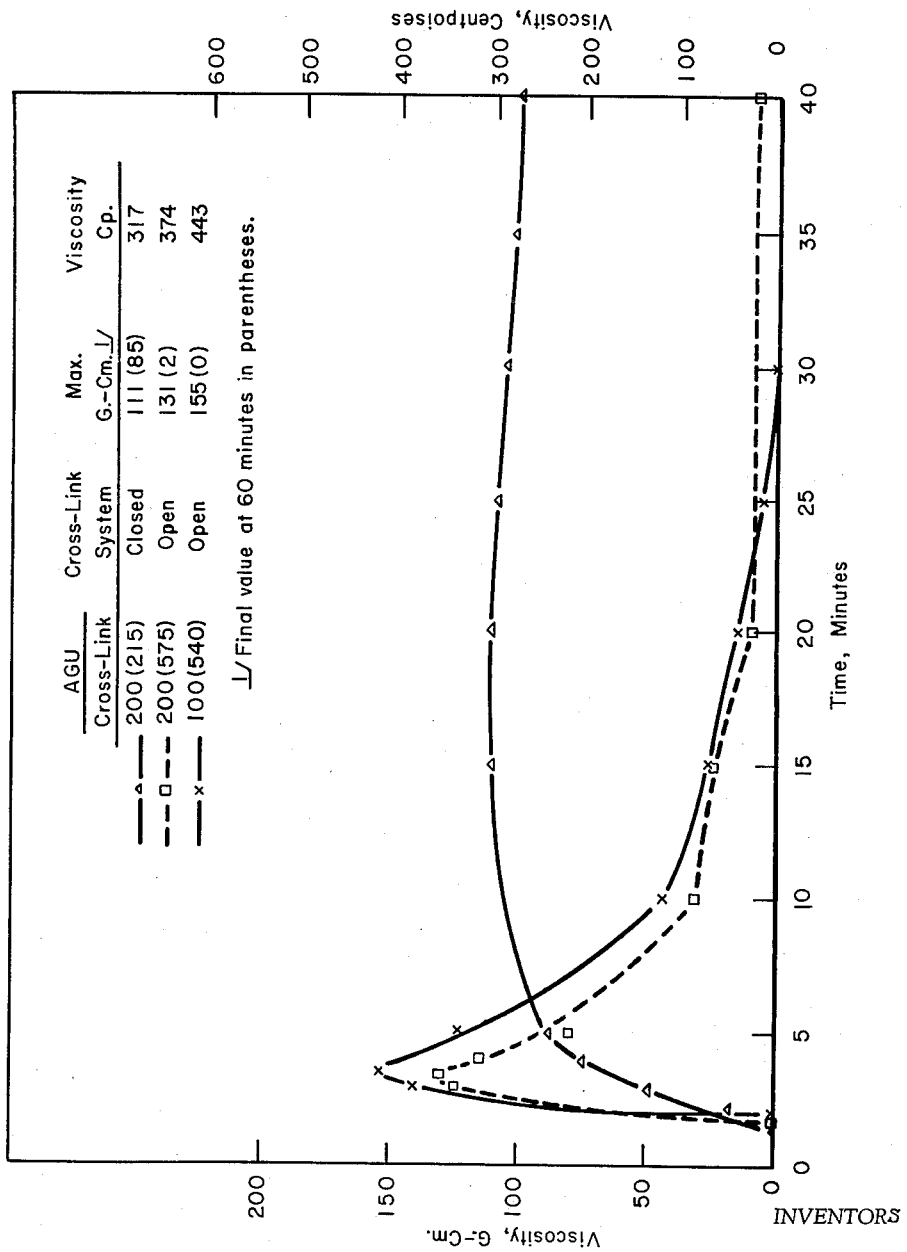
FIGURE 5 shows that cross-linking of starch with epichlorohydrin in an open system (values in parentheses) gives exaggerated values of cross-linking which are actually insufficient for the degree of oxidation employed.
Figure 6:
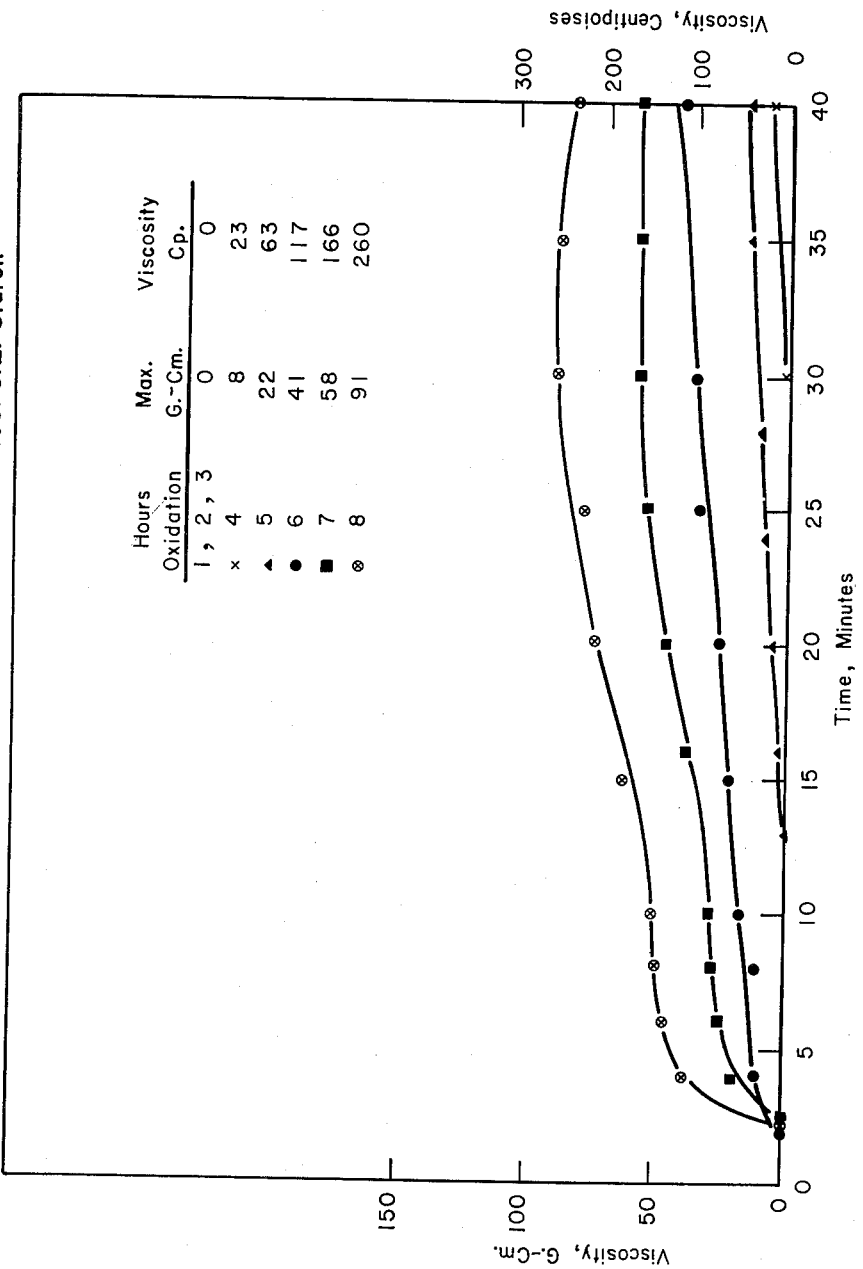
FIGURE 6 shows the extents of oxidation necessary for obtaining stabilized moderate viscosities with hypochlorite-oxidized starch which has been first cross-linked to the extent of 150 AGU/C.L.
Figure 7:
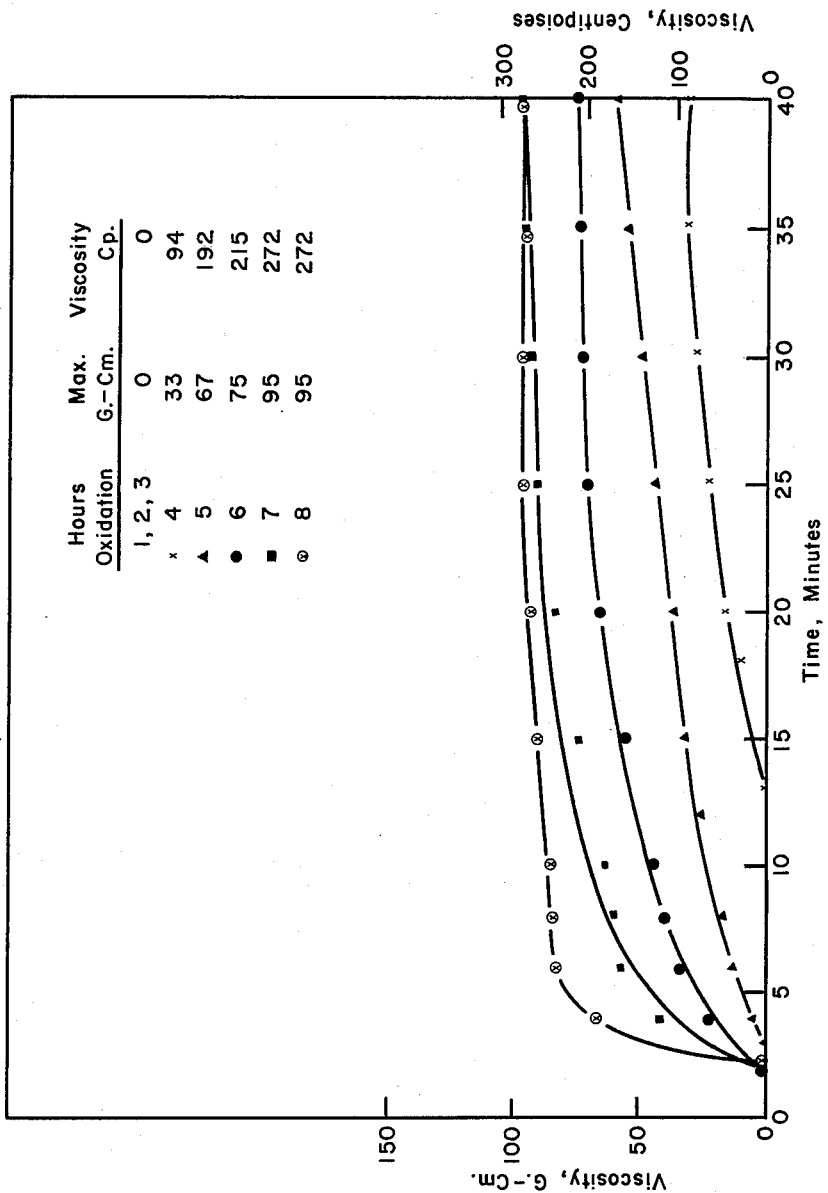

FIGURE 7 shows that for starch which is cross-linked to the extent of about 175 AGU/C.L., at least about 6 hours of hypochlorite oxidation (corresponding to about 96 percent NaOCl consumption) is necessary in order to obtain a stable, moderately high pasting viscosity.

EXAMPLE 1

*Preparation of epichlorohydrin cross-linked starch (200 AGU's/C.L.)*

Having determined by analysis that the use of an open system gives rise to extensive variation in the utilization of the highly volatile epichlorohydrin even though the latter be introduced very gradually and well below the surface of the starch slurry, a slurry comprising 1004 gm., dry basis, (6.40 moles) of Globe 3001 cornstarch in 1506 ml. of an alkaline solution prepared by dissolving 44.4 gm. of sodium hydroxide pellets and 1110 gm. anhydrous sodium sulfate in 6600 ml. of distilled water, was transferred from a 4-liter beaker to a 5-liter round-bottom 3-neck flask kept at 25±0.2° C. by a water bath. Centrally the flask received a Tru-Bore stirrer. Another neck contained a 24/40 joint connected by "Teflon" tubing to another 24/40 joint inserted in the top of a 500 ml. pear-shaped separatory funnel which funnel fit into the remaining neck to provide a closed system. Following the transfer of the slurry from the beaker to the reaction vessel, 502 ml. of the remaining alkaline solution (equal to one-half the weight of the dry starch) and 2.4285 ml., 2.866 gm. (0.031 mole) of epichlorohydrin were added from a calibrated buret to the separatory funnel and shaken until all the epichlorohydrin had dissolved, following which the solution was added to the starch slurry in 3 to 4 minutes for 18 hours of constantly stirred reaction at which time the slurry was transferred to a 4-liter beaker and neutralized to pH 6.00 with concentrated hydrochloric acid previous to filtration and washing the precipitate free of sulfate ion. Separation was necessary in this instance to permit an experimental determination of the degree of cross-linking (Hofreiter's anthrone method), but in the commercial preparation of the cross-linked, sodium hypochlorite oxidized starch such isolation would be a matter of choice.

EXAMPLE 2

*Oxidation of 1000 AGU/C.L. starch with sodium hypochlorite*

Sodium hypochlorite solution was prepared by passing chlorine gas into an ice cold sodium hydroxide solution of such strength that after the desired concentration (7.1–7.2 gms. percent) of sodium hypochlorite was obtained, the concentration of free NaOH was still 1.0–1.5 gms. percent, or about 0.25 N. In a 4-liter beaker 600 gm., dry basis (3.70 moles), of cross-linked starch prepared in the manner shown in Example 1, but using one-fifth as much epichlorohydrin, was slurried with 2100 ml. distilled water, and the pH of 8.1 was adjusted to 9.10 with 12 N sodium hydroxide, a temperature of 25±1° C. being maintained. Ice-cold sodium hypochlorite solution (508 ml., containing 7.10 gm. percent NaOCl or 0.38 mole) was added during 40 minutes. The pH rose to about 10.9 and then fell gradually to 9.3 at the end of 2 hours. Whenever the pH dropped to a value of about 8.5 it was restored to pH 9.1–9.2 with additional 12 N sodium hydroxide. At hourly intervals counting from the addition of the NaOCl solution, a suitable sample of the slurry was siphoned off for analysis. The filtrate was analyzed for NaOCl, using acidified KI solution and standard sodium thiosulfate solution, and the result expressed as gms. percent NaOCl. By subtraction from the known original NaOCl concentration, the percentage consumption of NaOCl was calculated. This particular oxidation was continued for 7 hours rather than the usual 8 hours since the 7-hour analysis showed that 98 percent of the oxidant had been consumed. The carboxyl content was determined by the paste titration method of Mattison et al. (Anal. Chem., 24, 1942–1944 (1952)) and was expressed as moles carboxyl/100 AGU.

Having thus disclosed our invention, we claim:

1. The method of treating starch to modify its hot-paste viscosity while providing stabilization of said modified viscosity to prolonged heating along with improved clarity and a marked resistance to "set-back," comprising the steps of cross-linking untreated starch in its natural granular state to the extent of about 25–300 AGU's per cross-link with epichlorohydrin, oxidizing the thusly cross-linked starch with sodium hypochlorite in the presence of substantial free alkali at a pH of about 9 until the starch contains between about 9 and about 3 moles of carboxyl per 100 anhydroglucose units, and recovering the cross-linked oxidized starch product in ungelatinized granular form.

2. Method of treating starch to modify its hot-paste viscosity while providing stabilization of said modified viscosity to prolonged heating along with improved clarity and a marked resistance to "set-back" comprising the steps of oxidizing starch, previously cross-linked with epichlorohydrin to the extent of between about 25–250 AGU's per cross-link, with sodium hypochlorite in the presence of substantial free alkali until the starch contains between about 9 and about 3 moles of carboxyl per 100 AGU's, and recovering the cross-linked oxidized starch product in ungelatinized granular form.

3. Method of claim 1 in which the starting excess free alkali is present in a concentration of about 0.25 N.

References Cited in the file of this patent

UNITED STATES PATENTS

| | | |
|---|---|---|
| 2,806,857 | Paschall | Sept. 17, 1957 |
| 2,880,236 | Mehltretter et al. | Mar. 31, 1959 |
| 2,894,945 | Hofreiter et al. | July 14, 1959 |
| 2,910,467 | Wimmer | Oct. 27, 1959 |